No. 889,505. PATENTED JUNE 2, 1908.
A. F. BINGENHEIMER.
FISH HOOK.
APPLICATION FILED JUNE 8, 1907.

WITNESSES.
INVENTOR.
Albert F. Bingenheimer
By Benedict, Morsell & Caldwell
ATTORNEYS

UNITED STATES PATENT OFFICE.

ALBERT F. BINGENHEIMER, OF MILWAUKEE, WISCONSIN.

FISH-HOOK.

No. 889,505.     Specification of Letters Patent.     Patented June 2, 1908.

Application filed June 8, 1907. Serial No. 377,848.

*To all whom it may concern:*

Be it known that I, ALBERT F. BINGENHEIMER, residing in Milwaukee, in the county of Milwaukee and State of Wisconsin, have invented new and useful Improvements in Fish-Hooks, of which the following is a description, reference being had to the accompanying drawings, which are a part of this specification.

This invention has for its object to provide a fish hook of such a construction that the main hook will be supplemented by a pair of trailing hooks which are spring mounted to receive the bait between them and bear on it with spring pressure, thereby holding the bait in position and affording a means at the rear end of the bait for hooking the fish, said means being rendered weedless by its relation to the bait.

With the above and other objects in view the invention consists in the fish hook herein claimed and all equivalents.

Figure 1:
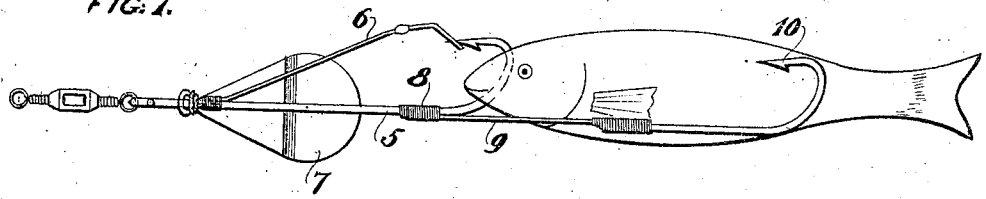
Figure 2:
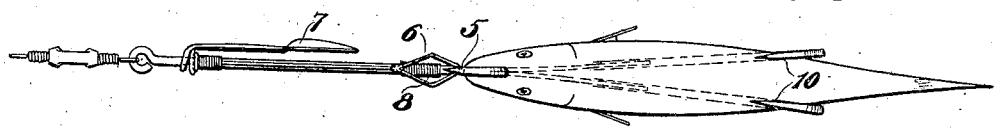
Figure 3:
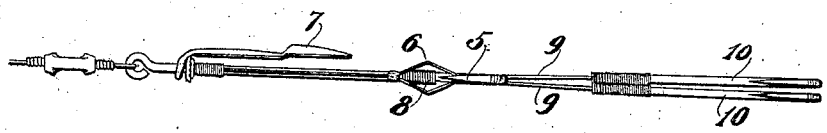
Figure 4:
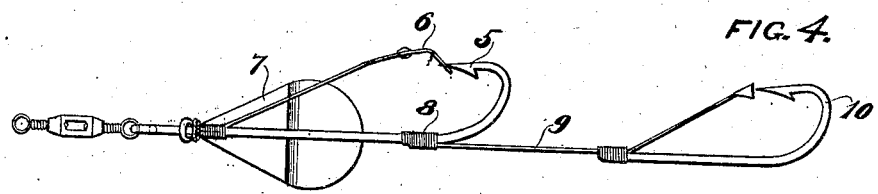

Referring to the accompanying drawings in which like characters of reference indicate the same parts in the several views;

Figure 1 is a side elevation of a fish hook constructed in accordance with this invention with a minnow secured in place thereon; Fig. 2 is a plan view thereof; Fig. 3 is a plan view of the hook with the bait removed; and, Fig. 4 is a side elevation of a modified form of this invention.

In these drawings 5 represents the main hook which is preferably of the weedless construction, having the weed guard 6 secured thereto in the usual manner, and 7 is the spoon mounted thereon in the ordinary way. In addition this main hook has secured to it, preferably by soldered windings 8 at its shank just ahead of the bend, a pair of connectors 9 which are desirably formed of light spring wire but which may be of any other suitable material, and these connectors have trailing hooks 10 bound to their rear ends. The trailing hooks may be of the ordinary type or may be weedless, as shown in Fig. 4.

In use, the bait, which may be a minnow or a frog or whatever desired, is engaged on the main hook in the usual manner and the pair of trailing hooks 10 are sprung apart from their normal position, which is shown in Fig. 3, so that they press against the sides thereof and hold it in proper position relative to the main hook that it may assume a natural position in passing through the water. By this means a fish will be prevented from tearing off the rear portion of the bait without being hooked, for the trailing hooks will be effective in such cases when the main hook would not be. The trailing hooks are rendered weedless in use, for they are protected by the body of the bait which extends between them, and by reason of the spring nature of their connecting wires this result is effectively produced with bait of various sizes. Furthermore, by reason of the spring action of the wire connecting means between the main hook and the trailing hooks the latter are caused to tightly bear against the sides of the bait so as to be partially embedded or depressed therein and thereby become less noticeable to the fish and less liable to interfere with casting.

What I claim as my invention is;

1. A fish hook, comprising a main hook for engaging bait, a pair of trailing hooks connected therewith, and means for giving the trailing hooks a tendency to move toward each other with pressure to clasp the bait therebetween.

2. A fish hook, comprising a main hook for engaging bait, a pair of trailing hooks, and spring means connecting the trailing hooks with the main hook for causing the trailing hooks to spring together and press against the sides of the bait.

3. A fish hook, comprising a main hook for engaging bait, a pair of trailing hooks, and spring wire connectors connecting the trailing hooks with the main hook and adapted to press the trailing hooks against the sides of the bait.

4. A fish hook, comprising a main hook for engaging bait, a pair of spring connecting wires connected with the shank of the main hook ahead of its bend, and a pair of trailing hooks connected with the connecting wires and adapted to bear on opposite sides of the bait.

5. A fish hook, comprising a weedless main hook for engaging bait, a pair of spring wire connectors connected with the main hook, and trailing hooks secured to the connectors and adapted to bear on opposite sides of the bait near the rear end thereof.

6. A fish hook, comprising a weedless main hook for engaging bait, a pair of spring connecting wires secured thereto, and weedless trailing hooks mounted on the connecting wires and adapted to be pressed thereby against opposite sides of the bait.

In testimony whereof, I affix my signature, in presence of two witnesses.

ALBERT F. BINGENHEIMER.

Witnesses:
   R. S. C. CALDWELL,
   ANNA F. SCHMIDTBAUER.